Figure 1:
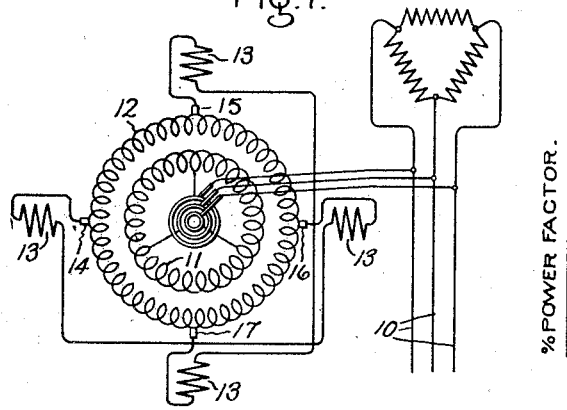

Aug. 11, 1931.  J. I. HULL  1,818,803
BRUSH SHIFTING DEVICE FOR ALTERNATING CURRENT DYNAMO ELECTRIC MACHINES
Filed Nov. 27, 1929  2 Sheets-Sheet 1

Inventor:
John I. Hull,
by Charles E. Mullen
His Attorney.

Aug. 11, 1931.   J. I. HULL   1,818,803
BRUSH SHIFTING DEVICE FOR ALTERNATING CURRENT DYNAMO ELECTRIC MACHINES
Filed Nov. 27, 1929   2 Sheets-Sheet 2
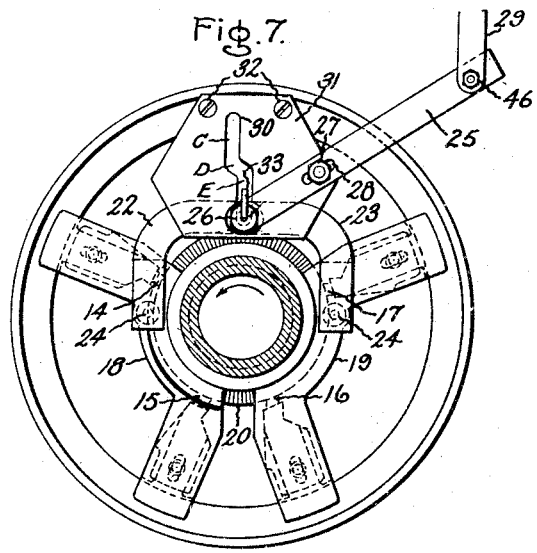
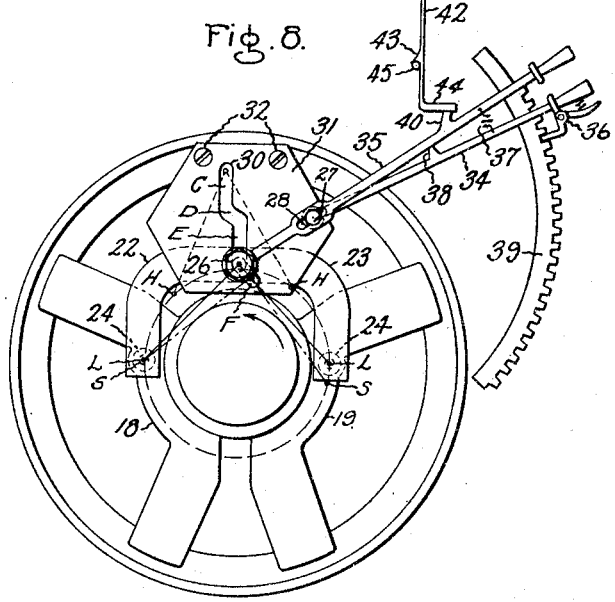
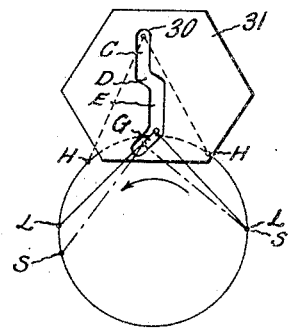
Inventor:
John I. Hull,
by Charles E. Tullar
His Attorney.

Patented Aug. 11, 1931

1,818,803

UNITED STATES PATENT OFFICE

JOHN I. HULL, OF SCHENECTADY, NEW YORK, ASSIGNOR TO GENERAL ELECTRIC COMPANY, A CORPORATION OF NEW YORK

BRUSH SHIFTING DEVICE FOR ALTERNATING CURRENT DYNAMO ELECTRIC MACHINES

Application filed November 27, 1929. Serial No. 410,197.

My invention relates to a brush shifting device for alternating current dynamo electric machines having a commutated winding. The principal object of my invention is to provide an improved single brush shifting arrangement which will give a wide range of variation in the motor speed above and below synchronous speed as well as power factor correction at all intermediate speeds except within a very small range of operation close to synchronous speed. These operating characteristics are illustrated and explained in my former invention disclosed in Letters Patent No. 1,648,688. Additional objects of my invention are to shift the brushes when starting the motor so as to reduce the starting current and to automatically bring the brushes back to the position they had prior to starting and to have the starting torque of the motor either normal, abnormally high, or abnormally low as desired.

It is well known to those skilled in the art that the usual Schrage type motor consists of a rotating primary winding, a stationary secondary winding consisting of independent phases, a regulating winding which preferably consists of an additional winding on the primary, a commutator connected to the regulating winding and two relatively movable brush yokes, each yoke having a system of brushes on the commutator and connected to corresponding ends of each independent secondary phase.

The following theoretical discussion will be of assistance in understanding the necessities for and the advantages of my invention. In the Schrage type motor above described the regulating winding in combination with the commutator is equivalent to a commutator type frequency changer and the current in the regulating winding has a frequency equal to that of the current induced in the stationary secondary winding. If in the Schrage type motor above described the brushes connected to the opposite ends of the secondary phases are on the same commutator segment no voltage from the regulating winding will be injected into the secondary windings and it is obvious that as each secondary winding is short-circuited through a commutator segment, the motor will run as an ordinary induction motor with approximately synchronous speed at no load. If the brushes are now separated a voltage from the regulating winding will be injected into the secondary windings. If the spacing of the brushes is symmetrical with respect to the secondary windings with which they are connected the voltage which is injected into the secondary windings will be such as to vary the speed of the motor without producing power factor correction. If the injected voltage is in phase with the below synchronism induced secondary voltage the motor will tend to run above its synchronous speed and if the injected voltage is in phase opposition to the below synchronism induced secondary voltage the motor will tend to run below its synchronous speed. Assuming the brushes when resting on the same commutator bar to be in a common symmetrical position in relation to the secondary windings with which they are connected it is obvious that the brushes can be separated in two different manners and if the brushes are moved at equal angular velocities, the symmetrical relationship will be retained. One such manner of brush separation will cause the motor to run above its synchronous speed whereas the other manner of brush separation will cause the motor to run below its synchronous speed. Thus the motor speed may be varied through a wide range without power factor correction.

If the brush spacing is non-symmetrical with respect to the secondary windings with which they are connected the injected voltage will have two components, one of them varying the motor speed and the other varying the power factor of the motor. Obviously that non-symmetrical spacing which improves the power factor of the motor is to be desired in order to escape power factor penalties and to improve the operating characteristics of the motor and, the transmission system. Power factor correction can not be obtained when the brushes pass each other in going from above to below synchronous speed or vice versa, because no voltage is injected into the secondary windings at that brush position. Various brush shifting devices have been proposed in which the brushes are simultaneously moved in opposite directions at different angular velocities. In these brush shifting devices the maximum power factor correction occurs at the maximum and minimum speeds but the power factor correction is gradually reduced to zero at approximately synchronous speed where the brushes pass each other on the commutator. Thus the central range of speed operation which is most used has the least power factor correction and hence these brush shifting devices possess this serious disadvantage. It therefore becomes desirable to improve the power factor correction at the central range of speed operation without sacrificing the power factor correction at the other operating speeds. This highly desirable result is accomplished by the brush shifting device disclosed in my Letters Patent No. 1,648,688, which may be briefly described in connection with an example in the following manner:

With the motor running at its minimum speed the brushes are shifted in opposite directions at the same or nearly the same angular velocities until approximately synchronous speed is reached and hence all power factor correction obtainable from that particular brush axis angle is retained up to this point. Then one system of brushes is stopped while the other system of brushes is moved by until the power factor correcting displacement is again established with the motor operating slightly above synchronous speed, after which the brushes are again moved in opposite directions at the same or nearly the same angular velocities until the maximum speed is reached, thus retaining beneficial power factor correction up to this point. This results in an improved power factor correction at all the speeds between maximum and minimum except within a very small range of operation close to synchronous speed. My invention, as disclosed in this application, provides a much simpler brush shifting device for substantially accomplishing the results of the brush shifting device disclosed in my Letters Patent 1,648,688.

In industry there are many types of machines which are most advantageously operated at different speeds to suit various processes but which run at a definite speed for each process. When the speed of the motor has been adjusted to suit a particular process it becomes desirable after the motor has been shut down to shift the brushes when starting the motor so as to reduce the starting current and to automatically return the brushes to their previously adjusted position, thus obviating the necessity of again finding the correct brush position by trial with its resultant delay. This highly desirable result my invention accomplishes by providing a speed adjusting handle and a separate starting handle each of which is able to independently move the motor brushes and the additional means automatically return the brushes to the position determined by the speed adjusting handle.

In industry there are many types of machines which accelerate under exceptionally heavy loads and consequently they require a high starting torque. On the other hand, there are many types of machines which require an abnormally low starting torque as, for example, ring spinning machines for cotton and wool where it is often desirable to start gently to avoid twitching the slack of the yarn which may have developed when the machine was stopped. This feature of an abnormally high or an abnormally low starting torque is accomplished by my invention by providing a special contour at that end of the control cam which corresponds to the motor starting position, the special contour determining the motor brush position in a manner to produce the desired torque.

My invention will be best understood from the following description when considered in connection with the accompanying drawings while the features of my invention which are believed to be novel and patentable are pointed out in the claims appended hereto.

Figure 4:
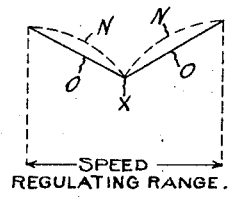
Figure 2:
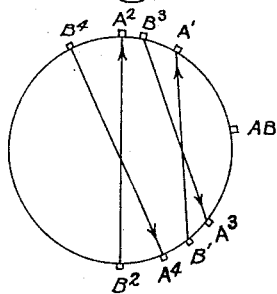
Figure 3:
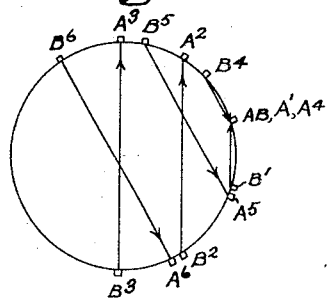
Figure 5:
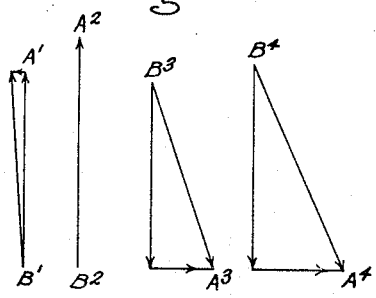
Figure 6:
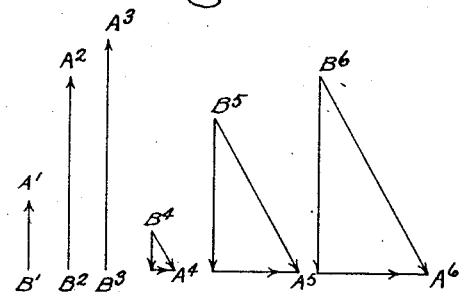

Fig. 1 represents the electrical connections of an alternating current, three phase motor with a commutated winding on the primary, this being one type of motor to which my invention is applicable. Fig. 2 is a vector diagram illustrating a method of brush shifting known to the prior art. Fig. 3 is a vector diagram illustrating the method of brush shifting according to my invention. Fig. 4 represents the comparative power factor correctioins obtained by the two different brush shifting methods. Figs. 5 and 6 separately illustrate the vectors of Figs. 2 and 3 respectively and show their respective power factor components. Fig. 7 illustrates my brush shifting mechanism applied to the motor whose speed is to be regulated and which gives improved power factor correction and normal starting torque. Fig. 8 illustrates one embodiment of means used for adjusting the speed of the motor by hand combined with the independent brush shifting arrangement for starting the motor with an abnormally high starting torque and the automatic device to bring the brushes back to the position determined by the speed adjusting handle. Fig. 9 represents a modification of the controlling cam shown in Fig. 8 to shift the brushes so that the motor will have an abnormally low starting torque.

Referring to Fig. 1, 10 represents a polyphase alternating current supply; 11 represents the primary rotor winding of a polyphase alternating current commutator motor supplied from 10 through suitable slip rings and brushes; 12 represents a separate regulating commutated winding situated on the primary, the regulating winding being represented as a Gramme ring for simplification only, but which in practice may be of any well known construction; 13 represents the separate phases of the stator secondary winding; 14 and 15 represent a system of brushes connected to the corresponding ends of the secondary windings; 16 and 17 represent a system of brushes connected to the other corresponding ends of the secondary windings, and for simplification I have omitted the commutator and show the commutator brushes 14, 15, 16 and 17 as resting directly on the winding 12. The system of brushes represented by 14 and 15 is carried by an adjustable brush holder yoke such as 18 in Fig. 7. The other system of brushes represented by 16 and 17 is carried by another adjustable brush holder yoke such as 19 in Fig. 7.

In Figs. 2 and 3 the circles are of the same diameter and represent 360 electrical degrees of commutator surface. It is apparent to one familiar with the differences of potential generated at various points around the circumference of a polyphase alternating current commutator that the voltage between the brushes for the various positions may be represented by the corresponding vectors shown in Figs. 2 and 3.

In Fig. 2, which represents the vector relations of the voltages injected into the secondary windings 13 when the motor is provided with a brush shifting arrangement of the prior art wherein the brushes are shifted in opposite directions at different angular velocities, A represents the brushes supported by the slow moving yoke and B represents the brushes supported by the faster moving yoke, AB represents the positions of the two systems of brushes resting on the same commutator bar, thus short-circuiting each independent secondary phase and causing the motor to run at substantially synchronous speed at no load. The brushes may be shifted through the position A'B' to the position A²B² to raise the motor speed to its maximum above synchronous speed or through the position A³B³ to the position A⁴B⁴ to lower the motor speed to its minimum below synchronous speed. If A²B² and A⁴B⁴ represent the desired power factor positions for maximum and minimum speeds it will be evident that the power factor correction gradually reduces to zero at substantially synchronous motor speed and at this point the motor runs with its inherent power factor for such speed. With the method of brush shifting illustrated in Fig. 2 the power factor plotted against speed for a given load may be represented by the full lines O in Fig. 4, where X represents the synchronous speed relation of the brushes with no power factor correction.

Fig. 3 represents the vector relations of the voltages injected into the secondary windings 13 with my brush shifting arrangement in which the mechanism is arranged so that in the synchronous speed region one brush system is held stationary while the other brush system is shifted past it and in the remaining speed regions both systems of brushes are moved in opposite directions and equal velocities. In this figure, AB represents the synchronous speed position of the brushes. Brush A is held stationary while brush B is shifted to B' or to B⁴ to respectively raise or lower the speed and resulting in the respective brush positions A¹B¹ and A⁴B⁴. This manner of brush shifting while passing through synchronous motor speeds quickly establishes a power factor correcting voltage which is injected into the secondary windings. If the brushes are at A'B' and they are separated by moving at approximately the same angular velocities the position A³B³ will be reached resulting in maximum speed. If the brushes are at A⁴B⁴ and they are separated by moving at approximately the same angular velocities the position A⁶B⁶ will be reached resulting in minimum speed. The power factor at the maximum and minimum speeds will be the same as that obtained in Fig. 2, assuming the same or an equivalent motor but at all intermediate speeds except synchronous speed a better power factor correction is obtained by my method of brush shifting. The approximate improvement in power factor correction to be expected by my invention over that of the prior art is represented in Fig. 4 where power factor is plotted against speed. Point X represents the power factor for both arrangements at synchronous speeds where there is no power factor correction. The full lines O represent the power factor with the old method of brush shifting and the dotted lines N represent the power factor with my method of brush shifting. By comparing curves N and O in Fig. 4, it can be seen that my method of brush shifting gives a better power factor correction at all intermediate speeds except within a very small range of operation close to synchronous speed.

It is pertinent at this point to explain why my brush shifting method gives improved power factor correction over the brush shifting method of the prior art. Running below synchronous speed the secondary windings of the motor have an inductive reaction effect, thus causing the motor to draw a lagging current from the power lines and hence the power factor is below unit. Running above synchronous speed the secondary windings of the motor have a smaller inductive reaction effect causing the motor power factor to be higher than that at similar loads with subsynchronous speeds. It is evident that the greatest power factor corrections should be made with the motor running below synchronous speed. In many types of brush shifting motors the power factor of the motor is very high when it is loaded and is running above synchronous speed and I have assumed such a type of motor for illustrative purposes. In such a type of motor the best power factor correction is obtained by so shifting the brushes that from synchronous speed to maximum speed the injected voltages do not have any power factor detracting components, thus permitting the brush shifting from synchronous speed to minimum speed to give the greatest power factor correction components obtainable with a total given brush shift. The brush shifting method illustrated in Fig. 2 only partially accomplishes these ideal results, whereas my brush shifting method as illustrated in Fig. 3 substantially accomplishes these ideal results. The contention of the foregoing statement is amply proved by a determination and comparison of the power factor components of the injected voltages in Figs. 2 and 3.

At the outset I wish to emphasize that the power factor components represented in Figs. 5 and 6 as the horizontal vectors pointing to the right raise the power factor of the motor, whereas power factor components pointing to the left lower the power factor of the motor.

Fig. 5 separately illustrates the vectors shown in Fig. 2. It can be seen that the vector $A^1B^1$ of Fig. 2 has a power factor component pointing to the left and the vector $A^2B^2$ of Fig. 2 has not any power factor component and thus from the synchronous speed to the maximum speed there is a small power factor detracting component injected into the secondary windings of the motor. The vectors $A^3B^3$ and $A^4B^4$ of Fig. 2 have power factor components pointing to the right as shown and thus from the synchronous speed to the minimum speed there is a power factor correcting component injected into the secondary windings of the motor.

Fig. 6 separately illustrates the vectors shown in Fig. 3. It can be seen that the vectors $A^1B^1$, $A^2B^2$ and $A^3B^3$ of Fig. 3 have no power factor components and thus from the synchronous speed to the maximum speed there is no power factor detracting component injected into the secondary windings of the motor and thus my method of brush shifting results in a higher power factor of the motor than that obtained under Fig. 2. The vectors $A^4B^4$, $A^5B^5$ and $A^6B^6$ of Fig. 3 have power factor components pointing to the right as shown, and thus from the synchronous speed to the minimum speed there are power factor correcting components injected into the secondary windings of the motor and these components are larger than the corresponding power factor components of Fig. 5, and thus my method of brush shifting results in a higher power factor of the motor than that obtained under Fig. 2.

Referring to Fig. 7; 14 and 15 represent the system of brushes carried by brush holder yoke 18 located on one side of the commutator 20, whereas 16 and 17 represent the system of brushes carried by brush holder yoke 19 located on the other side of the commutator 20. The ends of one secondary phase 13 are connected to brushes 14 and 16 and the ends of the other secondary phase 13 are connected to brushes 15 and 17. The brush yokes 18 and 19 are pivotally connected to the respective driving links 22 and 23 by the pins 24. The driving links 22 and 23 are pivotally connected to the lever 25 by the bolt 26. The lever 25 will hereafter be referred to as the operating member and it is held in position and pivoted by a bolt 27 fastened to the plate 31 but which slides in the slot 28 of the operating member thus permitting the latter to move radially and angularly. The operating member is connected by means of a pin 46 to the rod 29 which is extended to another operating lever not shown, or the rod 29 may be connected to the machine operated by the motor and so arranged as to impart the desired motion to the rod 29 for shifting the brushes to the desired position. Bolt 26 which connects the driving links moves in the cam groove 30 of the stationary supporting plate 31 which is fastened by bolts 32 to the motor frame or other suitable stationary part of the motor. A lubrication cup 33 is provided for lubricating the bolt 26 and it is obvious that if desired the bolts 26 and 27 may be provided with rollers to travel in their respective slots. To assist in understanding the action of the brush shifting mechanism I have divided the groove 30 into slots C, D, and E.

In Fig. 7 slots C and E are radial in respect to the center of the commutator and their direction is perpendicular to a line between the pins 24 which connect the driving links 22 and 23 and the brush yokes 18 and 19 when the latter are respectively in the regions corresponding to speeds above and below synchronism. Hereinafter C and E will be referred to as radial slots. The movement of bolt 26 in the radial slots C and E will move the yokes 18 and 19 in opposite directions at equal rates of speed. The slot D of the groove 30 is the arc of a circle whose center is one certain position of the pin 24 connecting the yoke 18 and the link 22 when the brush yokes are at a position corresponding to approximately synchronous speed. The movement of bolt 26 in the slot D causes the yoke 19 to move while yoke 18 remains stationary, the driving link 22 merely swivelling on its pin 24. Theoretically the slot D should be circular in form but in practice it may deviate somewhat from the circular form. During the remainder of this application the slot D will be referred to as the circular slot.

For illustrative purposes I have assumed the direction of rotation of the motor to be such that the position of the brushes and the corresponding position of the bolt 26 at the bottom of the radial slot E represents the minimum speed and what may be termed the normal starting torque of the motor and this corresponds to the brush positions $A^6B^6$ in Fig. 3. If the rod 29 is moved in the downward direction the operating member will cause the bolt 26 to move upward. When bolt 26 goes through the radial slot E the brushes move in opposite directions at equal rates of speed and the brushes go through the position $A^5B^5$ to the position $A^4B^4$ in Fig. 3 and at this latter position the motor operates slightly below its synchronous speed. If the bolt 26 is caused to travel through the circular slot D the yoke 18 will remain stationary while the yoke 19 will continue to move in the same direction it previously had and the brush position represented by $A^1B^1$ in Fig. 3 will be reached and the motor will operate slightly above its synchronous speed. If the bolt 26 is now caused to travel upwards through the radial slot C the brushes will again move in opposite directions at equal rates of speed and the respective direction of each yoke will be the same as when the bolt 26 traversed upwards through the radial slot E. In going through the radial slot C the brushes go through the position $A^2B^2$ to the position $A^3B^3$ in Fig. 3 and the motor is now operating at its maximum speed. In going from maximum to minimum speed the bolt 26 will go through the slots C, D and E and consequently the brushes will go in the reverse sequence through the same positions they had in going from minimum to maximum speed.

In Fig. 8 I have illustrated a hand-controlled operating member for adjusting the motor speed and a hand-operated starting lever for shifting the brushes when the motor is started so as to result in an abnormally high starting torque and means for automatically returning the brushes to the desired operating position.

In Fig. 8, 31 represents the control cam shown in Fig. 7 except that I have added the additional slot F to the groove 30; 34 and 35 represent the speed adjusting handle and starting handle respectively; 36 represents a clutch or other suitable device for holding 34 in the desired position; 37 represents a spring having its ends fastened to the two handles; 38 represents a stop projection on handle 34; 39 represents a toothed segment shaped in the arc of a circle; 40 represents a projection on the handle 35; 41 represents a three-pole, single-throw switch in the open position, 42 represents the insulated tie piece of the switch which has a stop projection 43 and an L-shaped extension 44 in contact with the projection 40. The extension 44 is made of such length and width that when the handle 35 is moved so as to bring the bolt 26 down to the bottom of the path F the projection 40 will remain in contact with the extension 44 and will have raised the extension 44 so as to close the switch 41 and thus start the motor with an abnormally high starting torque. The stop 45 is shown in contact with the projection 43 so as to limit the opened position of the switch 41. The speed adjusting handle 34 is shown in some predetermined desired running position of the motor and when the motor is stopped the brushes will remain in the position illustrated. The speed adjusting handle is held in its position by the clutch 36 engaged with a tooth of the segment 39. The starting handle 35 is represented in its normal position being held against the stop projection 38 by the spring 37. The operating handle 34 and the starting handle 35 both pivot on bolt 27. The starting handle 35 directly moves the bolt 26 through the groove 30. Movement of the operating handle 34 downward extends the spring 37 causing the handle 35 to move downward and the bolt 26 to move upward. Movement of the operating handle 34 upward pushes the handle 35 upward by means of the projection 38 and thus the bolt 26 moves downward. It is thus apparent that either handle can cause the bolt 26 to move through the groove 30.

It is often desirable to start the motor with either an abnormally high or an abnormally low starting torque as compared to the normal starting torque of the motor at the bottom of the radial slot E. It is well known to those skilled in the art that shifting the low speed brush axis against the direction of motor rotation increases the motor starting torque whereas shifting the brush axis with the direction of motor rotation decreases the starting torque of the motor. To give the motor an abnormally high or an abnormally low starting torque I provide an additional slot in the groove 30 of the control cam 31, the additional slot being shaped to shift the brush axis in the proper direction to give the desired starting torque. The fundamental principle involved is the same regardless of which abnormal torque is produced and therefore for illustrative purposes I have represented in Fig. 8 only the additional slot of the cam shaped to give the motor an abnormally high starting torque with a counter clockwise motor rotation as indicated by the arrow. This additional slot is represented by F and is located at the bottom end of the radial slot E. The slot F is the arc of a circle whose center is the pin 24 connecting the yoke 18 with its driving link 22 when the brush yokes are at the position corresponding to minimum motor speed. Theoretically the slot F should be circular in form but in practice it may deviate somewhat from the circular form. During the remainder of this application the slot F will be referred to as the additional circular slot F. It can be seen that the operation of the starting handle causing the movement of the bolt 26 through the additional circular slot F shifts the yoke 19 against the motor rotation, whereas the yoke 18 remains stationary, and thus the brush axis is shifted against the motor rotation with a resulting abnormally high starting torque. When the motor has sufficiently accelerated, the starting handle is released and the tension of the spring 37 will automatically bring the starting handle against the stop projection 38, thus bringing the brushes back to the adjusted running position.

When the brushes are moved to the starting position the motor can be started by the separate act of closing a switch or if desired the movement of the starting handle can close the starting switch. In Fig. 8 the movement of the starting handle 35 to shift the brushes to the starting position also causes the projection 40 to come in contact with the extension 44 and raise it thereby closing the switch 41 and starting the motor. The motor can be stopped by opening the switch 41 and the projection 43 comes against the stop 45 which leaves the switch in a position where it can be readily closed by the projection 40. If desired the projection 40 can be made to close an electrical interlock which will close the motor switch located at any desired remote position. In Fig. 8 the points LL of the full lines, the points HH of the dotted lines, and the points SS of the dot and dash lines represent the position in Fig. 8 of the pivot points 24 which connect the brush yokes 18 and 19 to their driving links 22 and 23 at the following respective brush positions; lowest speed, highest speed, and the starting position for abnormally high starting torque. These points do not show the actual brush positions but they do show the relative travel of the yokes from one position to the other position.

It is readily apparent that if it was desired to have the motor represented in Fig. 8 start with an abnormally low torque, the brush axis at starting should be shifted with the direction of rotation of the motor. In Fig. 9 I show the cam groove 30 of Fig. 7 except that I have added the slot G which is the arc of a circle whose center is the pin 24 connecting the yoke 19 and its driving link 23 when the brush yokes are at the position corresponding to minimum motor speed. Theoretically the slot G should be circular in form but in practice it may deviate somewhat from the circular form. During the remainder of this application the slot G will be referred to as the additional circular slot G. The operation of the starting handle causing the movement of the bolt 26 through the additional circular slot G shifts the yoke 18 with the motor rotation, whereas yoke 19 remains stationary and thus the brush axis is shifted with the motor rotation with a resulting abnormally low starting torque. In Fig. 9 the points LL of the full lines represent the position in Fig. 8 of the pivot points 24 which connect the brush yokes 18 and 19 to their driving links 22 and 23 at minimum speed, which is also the starting position of the brushes for normal starting torque, the points HH of the dotted lines represent the position for maximum speed and the points SS represent the position of abnormally low starting torque. These points do not show the actual brush positions but they do show the relative travel of the yokes from one brush position to another.

It is evident that if the motor is to rotate in the opposite direction with an abnormally high starting torque, the slot F should be at the top of the cam groove 30. In addition each pair of leads from a secondary winding should be interchanged and two out of the three primary leads should be interchanged. Also the starting handle 35 should be turned around so that its projection 40 points downwards. The switch 41 should be placed at the bottom so that its extension 44 can be moved by the projection 40 when the bolt 26 moves up through the slot F. Likewise, if the motor is to rotate in the other direction with an abnormally low starting torque, the slot G should be at the top of the cam groove 30 and the primary leads, secondary leads, starting handle 35 and the switch 41 should be changed as described above. An alternative method of reversing the direction of rotation is to invert the cam around a vertical axis.

In special cases it might be desirable to have a unidirectional motor that can be started with either an abnormally high or an abnormally low starting torque at the will of the operator. It is apparent that this can be readily accomplished by having additional circular slots F and G at the bottom end of the groove 30 in the cam 31, thus allowing the bolt 26 of Fig. 7 to enter and travel in either slot. If it is further desired to have the motor run in the opposite direction with the above named starting torque possibilities then the slots F and G should be at the top of the cam groove 30 and the primary leads, secondary leads, starting handle 35 and the switch 41 should be changed as described above or the cam inverted.

While I have described my invention in connection with a motor having a three-phase primary winding with an independent regulating winding and two-phase independent secondary windings, I wish it understood that my invention is generally applicable to any commutator dynamo-electric machine where it is desired to shift the brushes in the manner herein described. Also while I have described a definite cam contour with a definite brush yoke stationary during a part of the operating range yet I wish it understood that I do not wish to limit my invention to the particular contour shown or to the particular yoke described as stationary during a part of the operating range.

In accordance with the provisions of the patent statutes I have described the principles of operation of my invention, together with the apparatus which I now consider to represent the best embodiment thereof, but I desire to have it understood that such other modifications as fall fairly within the true spirit and scope of my invention are intended to be included within the scope of the appended claims.

What I claim as new and desire to secure by Letters Patent of the United States, is:

1. A brush shifting device for an alternating current commutator motor comprising two movable brush yokes, two driving mechanisms for the said brush yokes, pivoted connections between the said yokes and driving mechanisms located on opposite sides of the commutator, a reversible operating member for the said driving mechanisms, a common pivoted connection between the said reversible operating member and driving mechanisms, a stationary plate having an operating cam groove consisting of two radial slots connected by one circular slot to guide the said common pivoted connection so that during an intermediate and predetermined part of the regulating range one brush yoke is stationary while the other brush yoke is moving and during the remainder of the regulating range both brush yokes move in opposite directions at approximately equal angular velocities and a connection between said stationary plate and operating member to permit the latter to move radially and angularly.

2. A dynamo electric machine having a rotating commutator, two sets of adjustable brushes resting on said commutator, and a brush adjusting mechanism for the said machine comprising two movable brush yokes each supporting a set of brushes, a pair of links pivoted together at one end and having their opposite ends pivotally connected to the brush yokes on opposite sides of the commutator, means for moving the common pivoted connection of the said links toward and away from the center of the commutator, and means for guiding said common pivoted connection to cause the brush yokes to move in opposite directions with equal velocities over the greater portion of the regulating range and to cause one brush yoke to remain stationary while the other brush yoke is moving over a small and intermediate portion of the regulating range.

3. A brush shifting device for a commutator type dynamo electric machine, said device comprising two movable brush yokes, a driving link pivotally connected to each yoke, said connections being on opposite sides of the commutator, a common pivoted connection between the remaining ends of the driving links, means for moving the common pivoted connection toward and away from the center of the commutator, and means for guiding the common pivoted connection in such a manner that during a predetermined portion of its movement one brush yoke is stationary and the other brush yoke is moving.

4. A brush shifting device for a commutator type dynamo electric machine, said device comprising two movable brush yokes, a driving link pivotally connected to each yoke, said connections being on opposite sides of the commutator, a common pivoted connection between the remaining ends of the driving links, means for moving the common pivoted connection toward and away from the center of the commutator, and means for guiding the common pivoted connection in such a manner that during two separated and predetermined portions of its movement one brush yoke is stationary and the other brush yoke is moving.

5. A brush shifting device for a commutator type dynamo electric machine, said device comprising two movable brush yokes, a driving link pivotally connected to each yoke, said connections being on opposite sides of the commutator, a common pivoted connection between the remaining ends of the driving links, means for moving the common pivoted connection toward and away from the center of the commutator, and means for guiding the common pivoted connection comprising a stationary plate having an operating cam groove in which the common pivoted connection moves, the said groove consisting of two slots radially disposed with respect to the center of the commutator and connected by a circular slot formed as the arc of a circle whose center is the pivoted connection between one of the links and its associated brush yoke when the position of the latter corresponds to the movement of the common pivoted connection through the circular slot.

6. A brush shifting device for a commutator type dynamo electric machine, said device comprising two movable brush yokes, a driving link pivotally connected to each yoke, said connections being on opposite sides of the commutator, a common pivoted connection between the remaining ends of the driving links, means for moving the common pivoted connection toward and away from the center of the commutator, and means for guiding the common pivoted connection comprising a stationary plate having an operating cam groove in which the common pivoted connection moves, the said groove consisting of two slots radially disposed with respect to the center of the commutator, a circular slot connecting the two radial slots and an additional circular slot at the end of one of the radial slots, the circular slots being formed as the arcs of circles whose respective centers are the pivoted connection between one of the links and its associated brush yoke when the position of the latter corresponds to the movement of the common pivoted connection through the respective circular slot.

In witness whereof, I have hereunto set my hand this 26th day of November, 1929.

JOHN I. HULL.